US008666405B2

(12) United States Patent
Imbimbo et al.

(10) Patent No.: US 8,666,405 B2
(45) Date of Patent: Mar. 4, 2014

(54) LI/DR SERVICE CONTINUITY IN CASE OF NUMBER PORTABILITY

(75) Inventors: Amedeo Imbimbo, Caivano (IT); Biagio Maione, Naples (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 460 days.

(21) Appl. No.: 12/990,910

(22) PCT Filed: Aug. 26, 2008

(86) PCT No.: PCT/SE2008/050962
§ 371 (c)(1),
(2), (4) Date: Jan. 19, 2011

(87) PCT Pub. No.: WO2009/142565
PCT Pub. Date: Nov. 26, 2009

(65) Prior Publication Data
US 2011/0111756 A1    May 12, 2011

(30) Foreign Application Priority Data
May 23, 2008  (EP) .................................. 08156831

(51) Int. Cl.
*H04W 4/00* (2009.01)
*H04W 72/00* (2009.01)

(52) U.S. Cl.
USPC ..................................... 455/435.1; 455/452.1

(58) Field of Classification Search
USPC ............... 455/435.1, 445, 436–442
See application file for complete search history.

(56) References Cited

U.S. PATENT DOCUMENTS 6,078,648 A    6/2000  Albers et al.
6,738,633 B2 *  5/2004  Kim et al. ..................... 455/461

FOREIGN PATENT DOCUMENTS

WO    2006125459 A1    11/2006
WO    2007097667 A1    8/2007

OTHER PUBLICATIONS

International Search Report for PCT/SE2008/050962 dated May 5, 2009.
Written Opinion for PCT/SE2008/050962 dated May 5, 2009.
3GPP, "3rd Generation Partnership Project; Technical Specification Group Services and System Aspects; 3G security; Lawful interception architecture and functions (Release 7)," 3GPP TS 33.107 V7.7.0, Technical Specification, Sep. 2007, pp. 1-87.
3GPP, "3rd Generation Partnership Project; Technical Specification Group Services and System Aspects; 3G security; Handover interface for lawful interception (LI) (Release 7)," 3GPP TS 33.108 V7.10.0, Technical Specification, Dec. 2010, pp. 1-126.
3GPP, "3rd Generation Partnership Project; Technical Specification Group Core Network; Support of Mobile Number Portability (MNP); Technical realization; Stage 2; (Release 7)," 3GPP TS 23.066 V7.0.0, Technical Specification, Jun. 2007, pp. 1-83.

* cited by examiner

Primary Examiner — Charles Appiah
Assistant Examiner — Emem Stephen
(74) Attorney, Agent, or Firm — Potomac Patent Group PLLC (57) ABSTRACT

The present invention relates to methods and arrangements to perform monitoring-continuity in case of number portability in a telecommunication system. The method comprises a step wherein a monitored user (B) requires number portability from an operator of a donor network (DNW) to an operator of a recipient network (RNW). The method further comprises the receiving of a number portability event—temporary address (NPE1) to an agency controlled receiving entity (LEMF, ADRS), which event (NPE1) comprises information related to the user's ported identity and the user's new identity.

13 Claims, 7 Drawing Sheets

PRIOR ART

LI/DR SERVICE CONTINUITY IN CASE OF NUMBER PORTABILITY

TECHNICAL FIELD

The present invention relates to methods and arrangements to perform monitoring-continuity in case of number portability in a telecommunication system.

BACKGROUND

Mobile Number Portability is the ability for a UMTS or GSM mobile subscriber to change the subscription network within a portability domain whilst retaining the original MSISDN or MSISDNs. As part of the porting process administrative actions have to be performed by the network operators of the number range holder network (i.e. the network to which the number range containing the ported number has been allocated), donor network (i.e. the subscription network from which a number is ported in the porting process), recipient network (i.e. the network that receives the number in the porting process. The recipient network becomes the subscription network when the porting process is complete) and, as an option, by operators of other national UMTS or GSM networks. Number portability is described in the standards, see for example 3GPP TS 23.066 "Support of Mobile Number Portability (MNP) Technical realization; stage 2 (Release 7)".

Figure 1A:
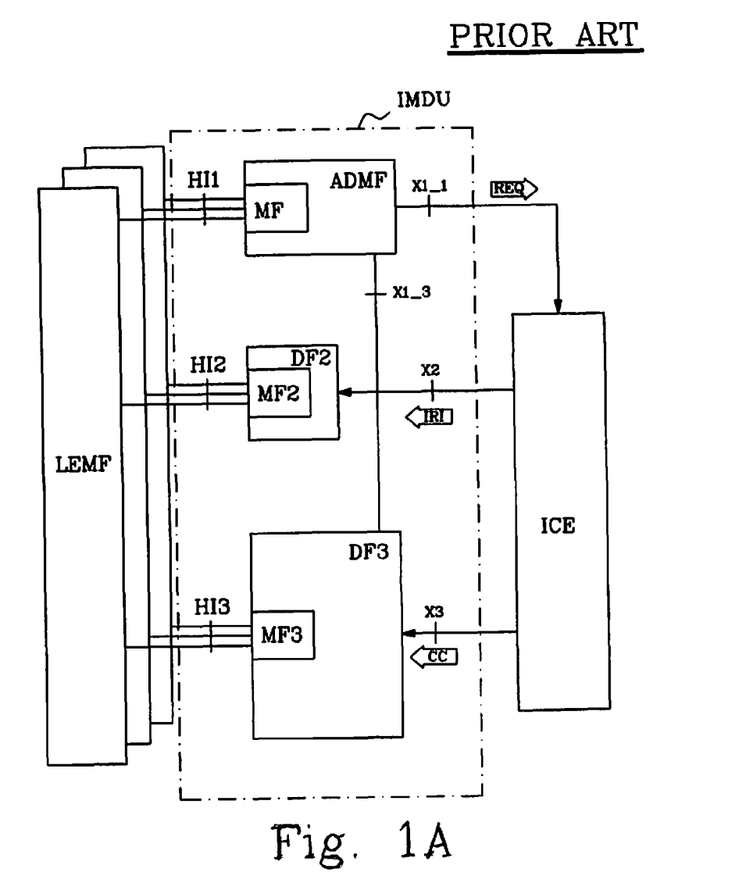
FIG. 1A is part of the prior art and discloses a block schematic illustration of an Intercept Mediation and Delivery Unit attached to an Intercepting Control Element.

FIG. 1A is part of the prior art and discloses an Intercept Mediation and Delivery Unit IMDU, also called Intercept Unit. The IMDU is a solution for monitoring of Interception Related Information IRI and Content of Communication CC for the same target. The different parts used for interception are disclosed in current Lawful Interception standards (see 3GPP TS 33.108 and 3GPP TS 33.107—Release 7). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICES that there might be multiple activations by different Law Enforcement Agencies. Messages REQ sent from LEMF to ADMF via HI1 and from the ADMF to the network via the X1_1 interface comprise identities of a target that is to be monitored. The Delivery Function DF2 receives Intercept Related Information IRI from the network via the X2 interface. DF2 is used to distribute the IRI to relevant Law Enforcement Agencies via the HI2 interface. The Delivery Function DF3 receives Content of Communication CC, i.e. speech and data, on X3 from the ICE. Requests are also sent from the ADMF to the Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated. In Packet Switching domain the events are session related or session unrelated.

Figure 1B:
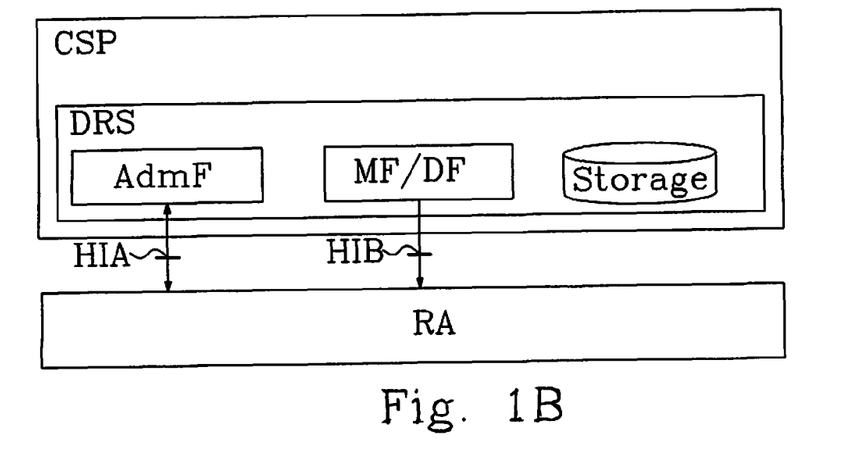
FIG. 1B is part of the prior art and discloses a block schematic illustration of Data Retention System connected to a Requesting Authority.

FIG. 1B belongs to the prior art and shows the Handover Interfaces between a Data Retention System DRS (see ETSI DTS/LI-00033 V0.8.1 and ETSI DTS/LI-0039) at a Communication Service Provider CSP, and a Requesting Authority RA. The figure shows an Administration Function AdmF used to handle and forward requests from/to the RA. A Mediation and Delivery function MF/DF is used to mediate and deliver requested information. A storage is used to collect and retain all possible data from external the data bases. The generic Handover Interface adopts a two port structure such that administrative request/response information and Retained Data Information are logically separated. The Handover Interface port 1 HIA transports various kinds of administrative, request and response information from/to the Requesting Authority and the organization at the CSP, which is responsible for Retained Data matters. The HIA interface may be crossing borders between countries. This possibility is subject to corresponding national law and/or international agreements. The Handover Interface port 2 HIB transports the retained data information from the CSP to the Requesting Authority. The individual retained data parameters have to be sent to the Requesting Authority at least once (if available). The HIB interface may be crossing borders between countries. This possibility is subject to corresponding national law and/or international agreements.

In a possible scenario of Number Portability implementation, an IN-based Mobile Number Portability MNP function is implemented in an MSC and handles incoming calls addressed within the portability domain. For mobile calls in GSM 900/GSM 1800 and WCDMA this is done at call setup (i.e reception of IAM message) by interrogating a Mobile Number Portability database. As result, a new network routing number is received from the database if the number is ported. The new network routing number is then used to modify and set-up an outgoing Initial Address Message (IAM) ISUP message towards the recipient network.

When a mobile number (e.g. 335-1111111) with a SIM1 (IMSI1) requires to be ported from an network operator T1 to another operator T2, the mobile user gets a new SIM (SIM2, IMSI1) and is assigned to a temporary number (e.g. 345-2222222). In the meanwhile the proper network configurations are set for the ported number and after a time period, the mobile user will be again assigned with the SIM2 to the former number (335-1111111). In the existing solution, if a target of monitoring is set on the number 335-1111111 (or alternatively on the IMSI1), as soon as the user requires the number portability to another operator and the temporary number 345-2222222 is assigned to him with the new SIM2, the monitoring of the target will be stopped.

SUMMARY

The present invention relates to problems that occur when Mobile Number Portability is required by a monitored subscriber. After a fulfilled number portability request, monitoring will be stopped, and important data might be lost.

These problems and others are solved by the invention by reporting to an agency when number portability has been requested by a monitored user, and thereby make possible for the agency to take appropriate measures to avoid data loss.

More in detail, the problem is solved by a method to perform monitoring-continuity in case of number portability. A monitored user requires number portability from an operator of a donor network to an operator of a recipient network. The method comprises the sending of a number portability event—temporary address, from the recipient network to an agency controlled receiving entity. The number portability event comprises information related to the user's ported identity and to the user's new identity represented by a temporary MSISDN.

In one aspect of the invention, the agency controlled receiving entity is a Law Enforcement Monitoring Facility used for Lawful Interception purposes and after reception of the temporary number the agency gets an opportunity to order interception of the user by using the users temporary MSISDN as target identity.

In another aspect of the invention, the agency controlled receiving entity is a Data Retention System into which time stamps specifying number portability events are received. The agency gets an opportunity to order reception of data that has been retained during specified time intervals.

An object of the invention is to enhance the LI/DR solution in order to ensure the continuity of interception and data retention in case of number ported from a network operator to another. This object and others are achieved by methods, arrangements, nodes, systems and articles of manufacture.

An advantage with the invention is that continuity of interception and data retention in case of number ported from a network operator to another will be ensured.

The invention will now be described more in detail with the aid of preferred embodiments in connection with the enclosed drawings.

DETAILED DESCRIPTION

Figure 2:
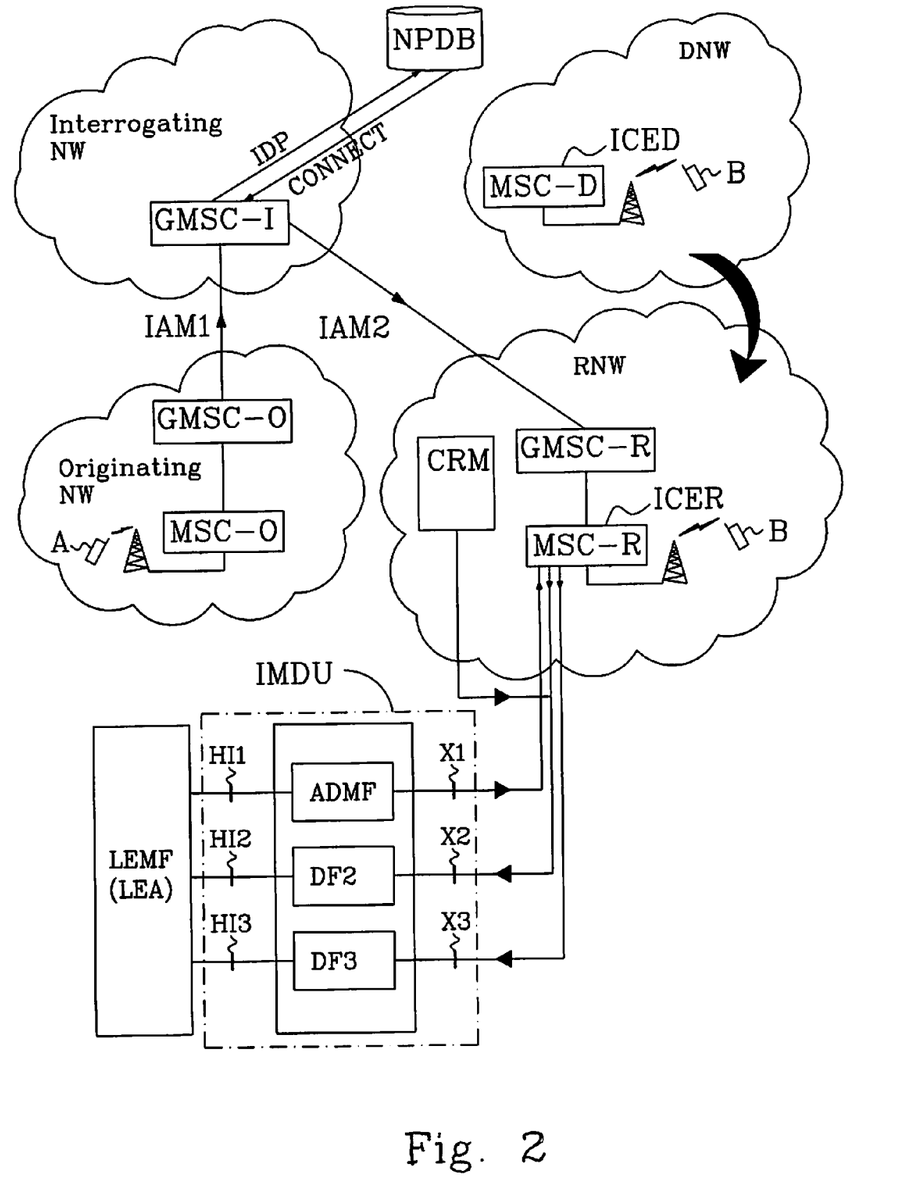
FIG. 2 is a block schematic illustration disclosing a B-subscriber requesting number portability from a donor network to a recipient network. An Intercept Mediation and Delivery Unit is attached to the recipient network.

FIG. 2 discloses a telecommunication system that in this example comprises four Public Land Mobile Networks, an originating network NW, an interrogating network NW, a Donor Network DNW and a Recipient Network RNW. A calling party is located in the originating network and the called party B is at first located in the Donor network DNW. The interrogating network handles incoming calls addressed within a portability domain. The portability domain is in this example a set of GSM Public Land Mobile Networks in a country between which MSIDNs may be ported or alternatively it may be a set of North American GSM Mobile Networks and other subscription networks within a regulated geographical area within North America. As already explained, mobile Number Portability is the ability for an UMTS or GSM mobile subscriber to change the subscription network within a portability domain whilst retaining the original MSISDN or MSIDNs. In a first embodiment that will be explained below the called subscriber will change subscription from the Donor Network to a Recipient Network. In the figure the called party B can be seen as located within the recipient network after having changed location from the Donor Network. The location change is shown in FIG. 2 with a filled bowed arrow. The recipient network RNW comprises a Gateway Mobile Service Switching Centre GMSC-R attached to a Mobile Service Switching Centre MSC-R/ICER which in turn is attached to a base station that covers a radio cell in which the called party is located after the location change. In the same way a Gateway Mobile Service Switching Centre GMSC-O and a Mobile Service Switching Centre MSC-O can be seen within the Originating Network. A Mobile Service Switching Centre MSC-D/ICED attached to a base station that covers a radio cell in which the called party is located before the location change can be seen within the Donor Network. A Gateway Mobile Service Switching Centre GMSC-I is located within the Interrogating Network. GMSC-I is used to interrogate a Mobile Number Portability Data Base NPDB. The NPDB is an operational database (used in real time at call set-up) which provides portability information. To be noted is that the network configuration shown in FIG. 2 just is to be seen as an example and that the invention is applicable also for example to fixed networks or IMS networks. A Customer Reference Management system CRM can be seen within the recipient network in FIG. 2. Each telecom operator has got a CRM to manage the subscriber information, e.g. name, address, subscribed services, user identities etc. In this example both the Donor Network and the Recipient Network each comprises a CRM even though only one CRM can be seen (in RNW) in FIG. 2. An Intercept Mediation and Deliver unit IMDU is schematically disclosed in FIG. 2. The IMDU is attached to MSC-R and to CRM in the Recipient Network. The IMDU is also logically attached to MSC-D and CRM in the Donor Network and used for example before number portability is requested by B. The Intercept Unit IMDU has already been explained in the background part of this application. The signalling IAM1, IDP, CONNECT and IAM2 that can be seen in FIG. 2 will be further explained below together with the explanation of a method according to the invention. In the first embodiment interception has been set on the called party B by using the MSIDN number 335-1111111 that was assign to the party when using the Donor network as subscription network. The Donor network is the same as the party's subscription network before the party requests number portability to the Recipient Network RNW.

Figure 3:
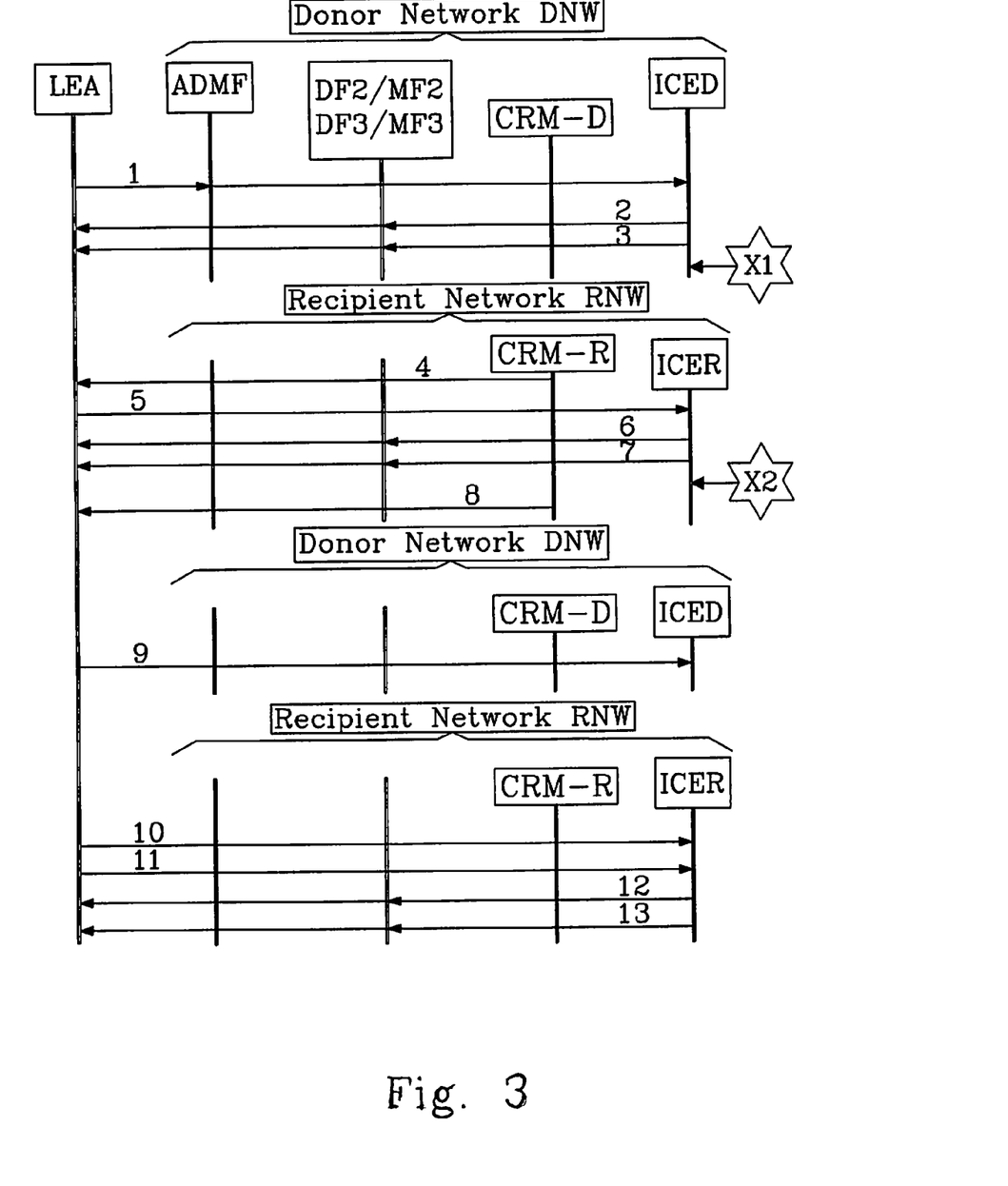
FIG. 3 discloses a signal sequence diagram representing a method for Lawful Interception continuity in case of number portability.

A method according to the first embodiment of the invention will now be described more in detail together with FIG. 3. FIG. 3 discloses a signal sequence diagram representing a method to perform interception-continuity when the called party requests number portability from the Donor Network DNW to the Recipient Network RNW. Signaling in FIG. 3 that can be seen below a box named "Donor Network DNW" represents signaling from/to entities in the Donor Network and signaling involving the IMDU when the IMDU is logically attached to MSC-D in the Donor Network. Signaling in FIG. 3 below a box named "Recipient Network DNW" represents signaling from/to entities in the Recipient Network and signaling involving the IMDU when the IMDU is logically attached to MSC-R and CRM in the Donor Network. An Intercepting Control Element ICED shown in FIG. 3 is the same entity as the Mobile Service Switching Centre MSC-D that was shown in FIG. 2. An Intercepting Control Element ICER shown in FIG. 3 is the same entity as the Mobile Service Switching Centre MSC-R that was shown in FIG. 2. CRM-D and CRM-R in FIG. 3 corresponds to the Customer Reference Management system CRM in the Donor and Recipient Network respectively. LEA, ADMF, DF2/MF2, DF3/MF3 corresponds to the already explained entities shown in FIGS. 1 and 2. The method according to the first embodiment of the invention comprises the following steps:

The Law Enforcement Agency LEA orders the interception of the party B using its MSISDN (335-1111111) in the donor network. An interception request 1 is sent from the LEA via ADMF to ICED.

Traffic activity is detected in the ICED and Intercept Related Information IRI 2 and optionally Content of Communication CC 3 are sent to the LEA for each communication involving the specified MSISDN.

The party B requires being ported "X1" to another operator (recipient NW). B hereby gets a new International Mobile Subscriber identity IMSI2 and is temporarily assigned to a Mobile Station International ISDN Number 345-2222222. From this moment the user is able to make and receive calls with this temporary number using the recipient network and possibly also using the ported number with the donor network.

According to the invention, the CRMs have been configured with the DF2/MF2 address and will automatically send Number Portability events to the Law Enforcement Agencies LEAs or alternatively just to the interested LEA. The CRM will send an IRI report for all subscribers or, as an option, only for target subscribers, set by the LEA. The CRM-R of the recipient network informs the LEA (by means of an IRI REPORT "Number portability event, temporary address" 4 through DF2/MF2 about the temporarily identities assigned to the ported number. An advantage is that the automatic signalling won't imply to human intervention to inform the agency about number portability and to re-set the target of interception in the receiving network.

The Law Enforcement Agency LEA orders the interception of the party B using its temporary MSISDN (335-2222222) in the recipient network. An interception request 5 is hereby sent from the LEA via ADMF to ICER.

The calling part A sets up a call towards the called party B in accordance with the following already known Mobile Number Portability procedure (see FIG. 2): I) An incoming Initial Address Message IAM1 is received from the Originating Network to the Interrogating Network. II) An Initial Detection Point IDP is sent from GMSC-I to the Number Portability Data Base NPDB. III) The NPDP sends a CONNECT operation containing a Network Prefix NP concatenated to the MSISDN. IV) The GMSC-I in the Interrogating Network modifies the CalledPartyNumber parameter value to NP+MSISDN and sends it as Initial Address Message IAM2 to the Recipient Network the call is set up.

Traffic activity is detected in the ICER and IRI 6 and optionally the CC 7 are sent to the LEA for the communication involving the specified MSISDN (345-2222222).

The proper network configuration is set "X2" for the ported number to address the calls towards the recipient network. This is provided by means of a query request towards the NP DB that adds a prefix to the number or converts the dialed number (335-1111111) into a routing number and any call to the ported user number 335-1111111 is routed to the Recipient Network.

The CRM-R of the recipient network informs the LEA (by means of an IRI REPORT "Number portability event, completion" 8 through DF2/MF2 about the completion of the number portability process. In some NP implementations, the routing number used to address the call set in the NPDB could be equal to the temporary assigned identities. In this, NPDB could also be used to report the event of NP completion. The CRM provides the old identities and the temporary number. The NPDB translates the old ids into a routing number used to route the call towards the recipient network. Note that if the temporary assigned number is used as routing number, the IRI report can also be provided by the NPDB, as alternative to the CRM.

In this example the LEA decides to remove 9 the interception of target MSISDN=335-1111111 in the doner Network. It's up to the agency to order removal of the interception on the target identities in the donor network.

In this example the LEA decides to remove 10 the interception of target MSISDN=345-2222222 in the recipient network. It's up to the agency to order removal of the interception on the target identities in the recipient network.

In this example the LEA decides to set 11 interception of target MSISDN=335-1111111 in the recipient network.

A calling party sets up a call to the called party B and traffic activity is detected in the ICER and IRI 12 and optionally the CC 13 are sent to the LEA for the communication involving the specified MSISDN (335-1111111).

Figure 4:
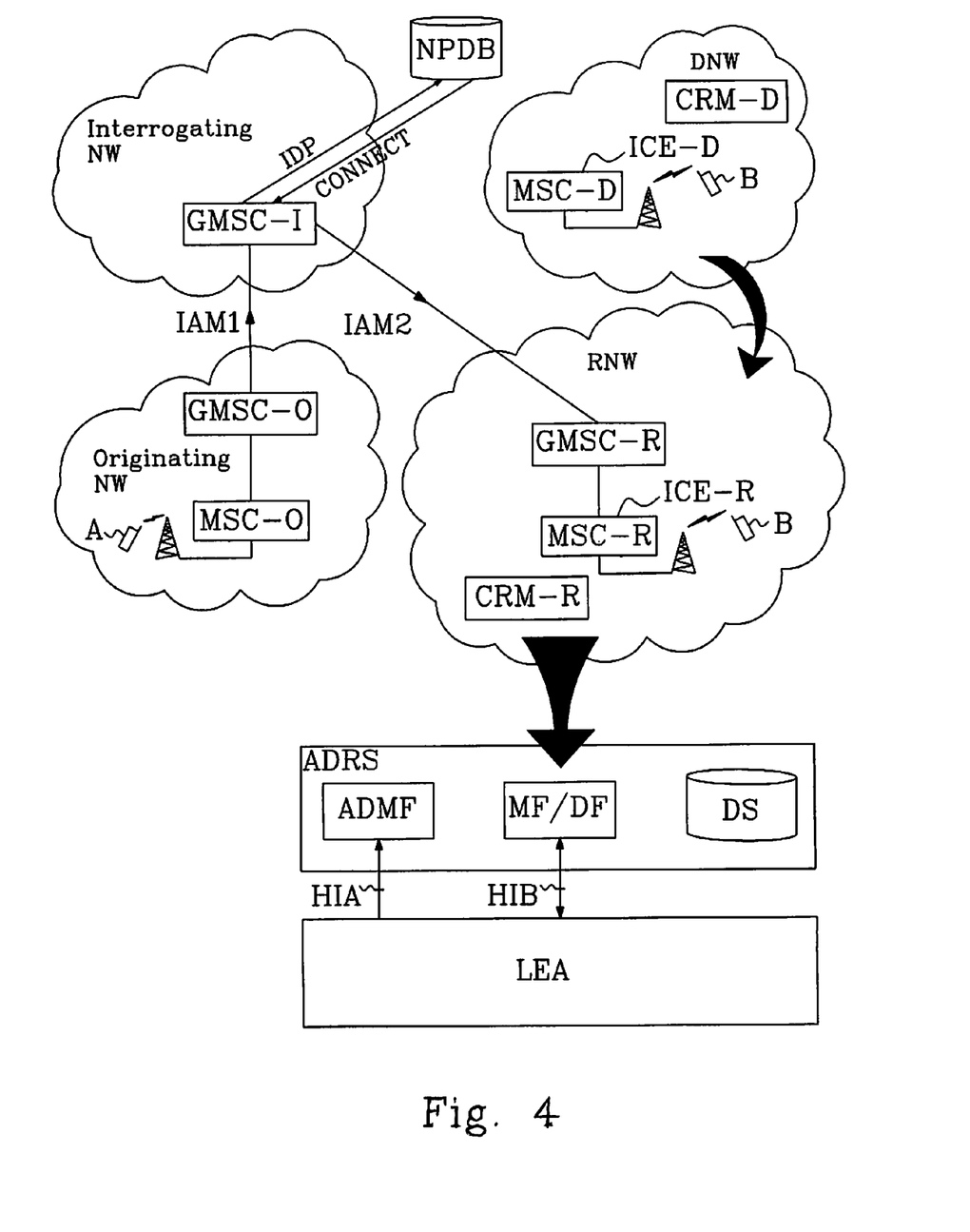
FIG. 4 is a block schematic illustration disclosing a B-subscriber requesting number portability from a donor network to a recipient network. A Data Retention System is attached to the recipient network.

FIG. 4 discloses the same telecommunication system as the one that have been explained earlier together with FIG. 2. In this second embodiment instead of receiving intercepted data, the LEA will receive retained data. Like before, also in the second embodiment that will be explained below, the called subscriber will change subscription from the Donor Network to the Recipient Network.

A Data Retention System ADRS is schematically disclosed in FIG. 4. The ADRS is attached to MSC-R/ICE-R and to CRM-R in the Recipient Network (shown with a thick filled arrow). The DRS is also logically attached to MSC-D/ICE-D and CRM-D (not shown in the figure) in the Donor Network and used for example before number portability is requested by B. The Data Retention System DRS has already been explained in the background part of this application. The signalling IAM1, IDP, CONNECT and IAM2 that can be seen in FIG. 4 has already been explained. In the second embodiment reception of retained data has been set on the called party B by using the MSIDNS number 335-1111111 that was assign to the party when using the Donor network as subscription network. The Donor network is the same as the party's subscription network before the party requests number portability to the Recipient Network RNW.

Figure 5:
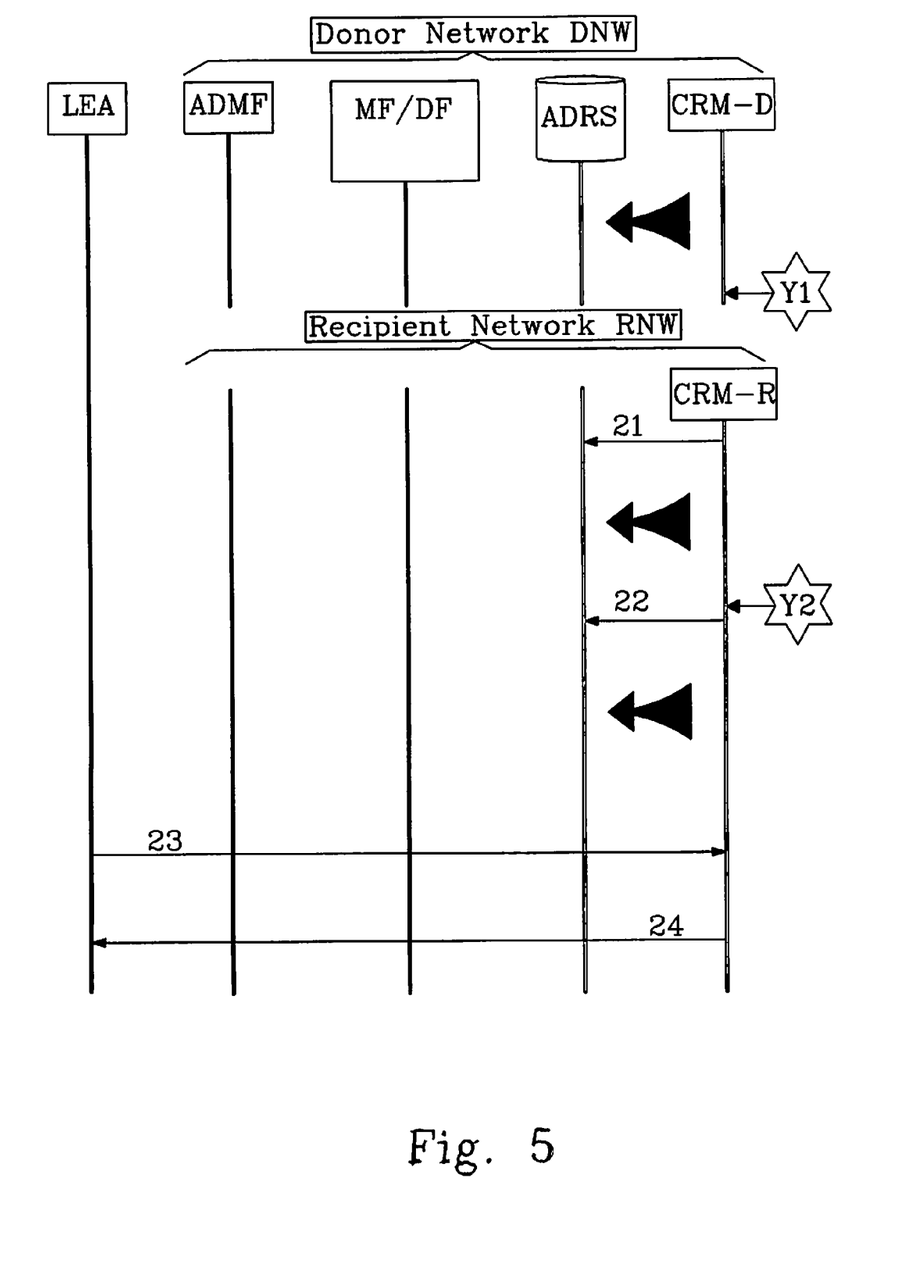
FIG. 5 discloses a signal sequence diagram representing a method for reception continuity of retained data in case of number portability.

A method according to the second embodiment of the invention will now be described more in detail together with FIG. 5. FIG. 5 discloses a signal sequence diagram representing a method to perform monitoring-continuity of retained data when the called party requests number portability from the Donor Network DNW to the Recipient Network RNW. Signaling in FIG. 5 that can be seen below a box named "Donor Network DNW" represents signaling from/to entities in the Donor Network and signaling involving the DRS when the DRS is logically attached to MSC-D in the Donor Network. Signaling in FIG. 5 below a box named "Recipient Network DNW" represents signaling from/to entities in the Recipient Network and signaling involving the DRS when the DRS is logically attached to MSC-R and CRM in the Donor Network. LEA, ADMF, MF/DF ADRS, CRM-D and CRM-R corresponds to the already explained entities shown in previous figures. The method according to the second embodiment of the invention comprises the following steps (not all steps are shown in FIG. 5):

Traffic activity is detected in the MSC-D (see FIG. 4) and IRI is sent to and stored in the storage DS in ADRS for each communication involving the MSISDN=335-1111111.

The party B requires being ported "Y1" to another operator. B hereby gets a new International Mobile Subscriber identity IMSI2 and is temporarily assigned to a Mobile Station International ISDN Number 345-2222222. From this moment the user is able to make and receive calls with this temporary number using the recipient network and possibly also with the ported number with the donor network.

The CRM-R of the recipient network informs the ADRS (by means of an IRI REPORT "Number portability event, temporary address" 21 about the temporarily identities assigned to the ported number. The newly introduced IRI report could be sent from the recipient network but also from the Donor network operator if this is automatically notified from the recipient network operator. The IRI REPORT further comprises a time stamp T1 that indicates start time to validate temporary MSISDN=335-2222222.

The calling part A sets up a call towards the called party B in accordance with the following already known Mobile Number Portability procedure (see FIG. 2): I) An incoming Initial Address Message IAM1 is received from the Originating Network to the Interrogating Network. II) An Initial Detection Point IDP is sent from GMSC-I to the Number Portability Data Base NPDB. III) The NPDP sends a CONNECT operation containing a Network Prefix NP concatenated to the MSISDN. IV) The GMSC-I in the Interrogating Network modifies the CalledPartyNumber parameter value to NP+MSISDN and sends it as Initial Address Message IAM2 to the Recipient Network the call is set up.

Traffic activity is detected in the MSC-R (see FIG. 4) and IRI is sent to and stored in the storage DS in ADRS for each communication involving the temporary MSISDN=335-2222222.

The proper network configuration is set "Y2" for the ported number to address the calls towards the recipient network. This is provided by means a query request towards the NP DB that adds a prefix to the number or converts the dialed number (335-1111111) into a routing number and any call to the ported user number 335-1111111 is routed to the Recipient Network.

The CRM-R of the recipient network informs the ADRS (by means of an IRI REPORT "Number portability event, completion" 22 about the completion of the number portability process. The IRI REPORT further comprises a time stamp T2 that indicates start time to validate temporary MSISDN=335-1111111.

A calling party sets up a call to the called party B and traffic activity is detected in the MSC-R (see FIG. 4) and IRI is sent to and stored in the storage DS in ADRS for each communication involving the MSISDN=335-1111111.

The Law Enforcement Agency LEA orders 23 reception of retained data of the party B to ADRS by specifying a time range T0-T3 where T0 is a time stamp earlier than T1, and T3 is a time stamp later than T2.

The ADRS finds in DS retained data of the party B during the specified time range T0-T3.

Requested subscriber data is sent 24 from the ADRS to LEA.

Figure 6:
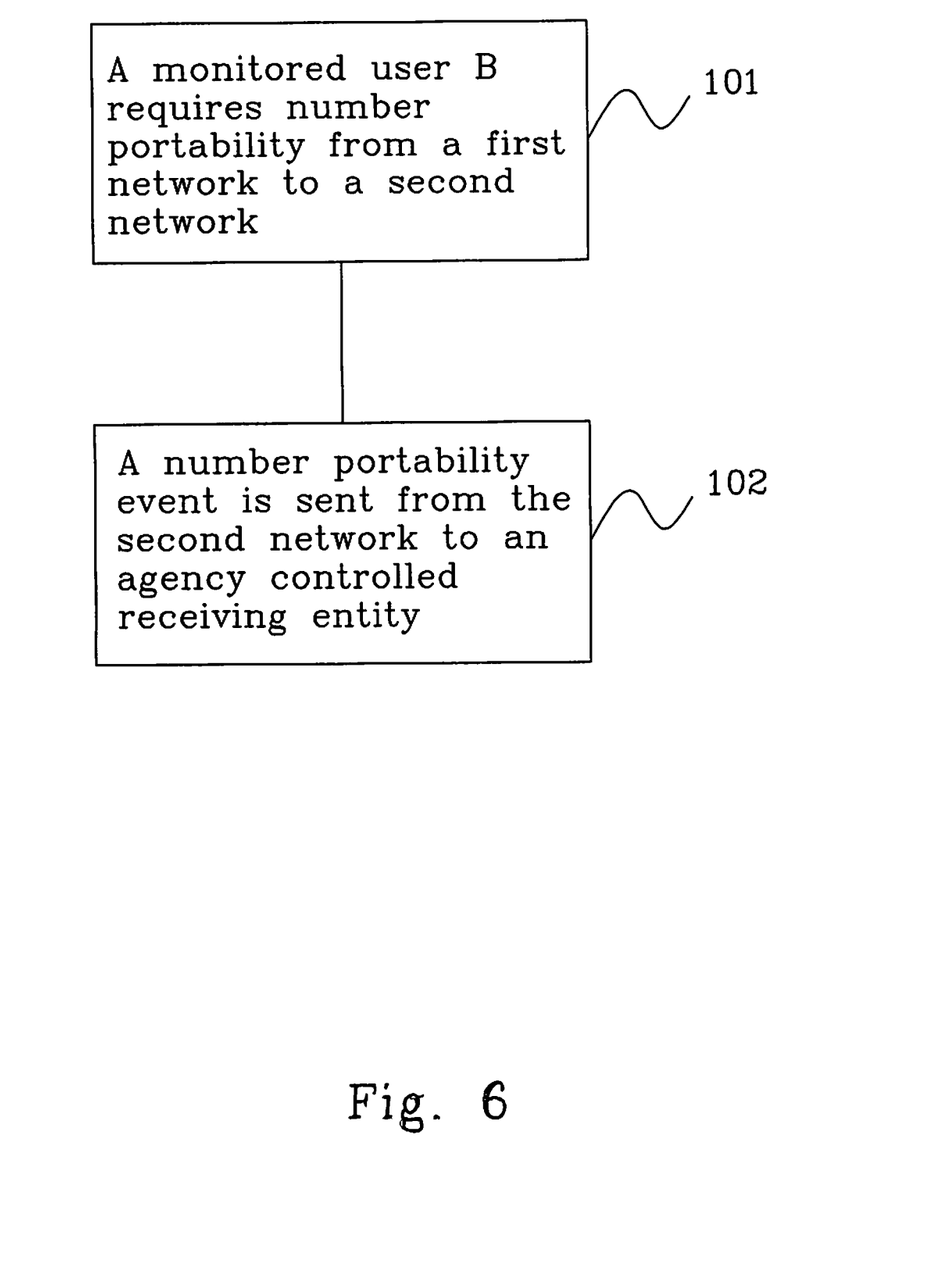
FIG. 6 discloses a flow chart illustrating some essential method steps of the invention.

FIG. 6 discloses a flow chart illustrating some essential method steps of the invention. The flow chart is to be read together with the earlier shown figures. The flow chart comprises the following steps:

A monitored user B requires number portability from an operator of a donor network DNW to an operator of a recipient network RNW. This step is shown in the figure with a block 101.

A number portability event—temporary address (NPE1) is sent, in this example, from the recipient network to an agency controlled receiving entity LEMF, ADRS. The event NPE1 comprises information related to the user's ported identity and the user's new identity. This step is shown in the figure with a block 102.

Figure 7:
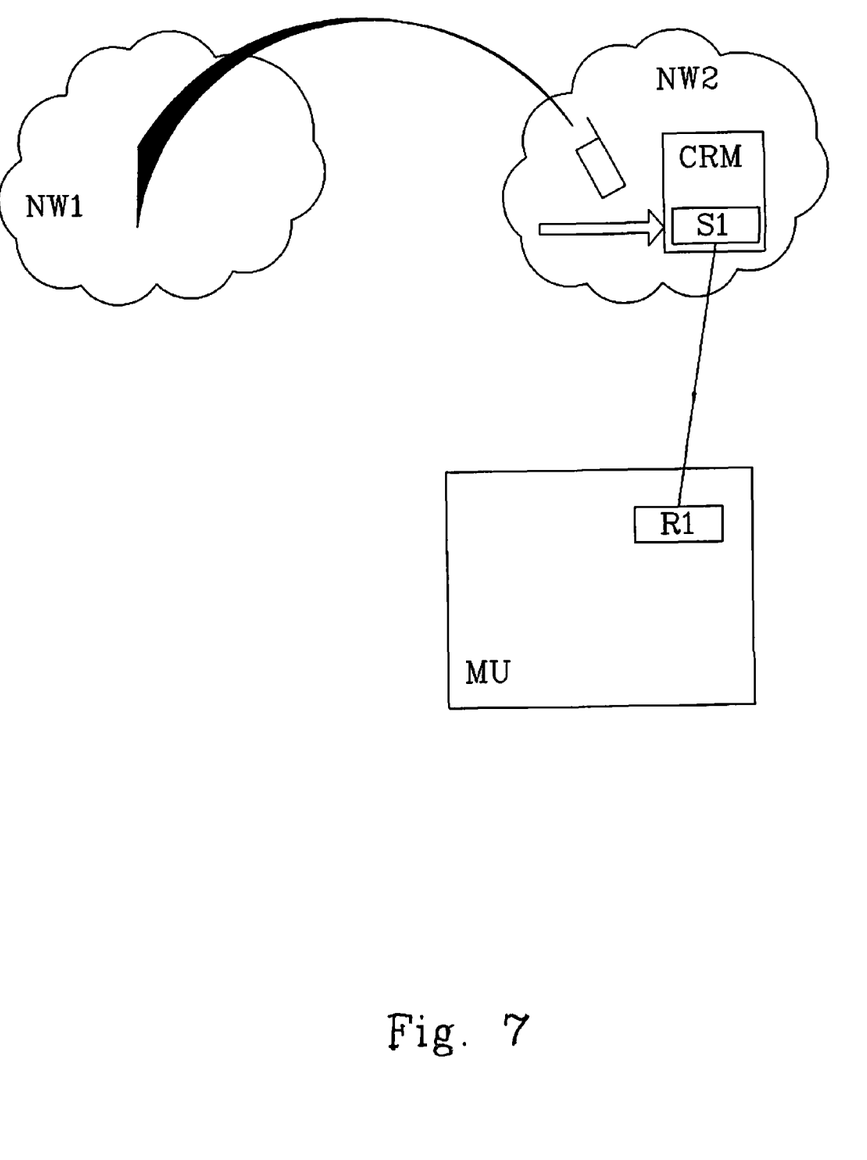
FIG. 7 schematically discloses an example of a system that can be used to put the invention into practice.

A system that can be used to put the invention into practice is schematically shown in FIG. 7. The block schematic constellation corresponds in many parts to the ones disclosed in FIGS. 1, 2 and 4. Upon a number portability request by a mobile unit from a first network NW1 to a second network NW2 and upon setting of a proper network configuration after lapse of a time period, a Customer Reference Management System CRM is informed of the current status. A sender S1 is capable to transmit information of the current status to a receiver R1 located in an agency controlled receiving entity that can be for example a Law Enforcement Monitoring Facility or a Data Retention System or similar.

Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The invention is for example applicable also to the fixed network and to IMS, and event to the portability of subscriber between different network types e.g. from fixed network to IMS The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multifunction hardware. Processing functions may be implemented using a programmed microprocessor or general-purpose computer. The invention is not limited to the above described and in the drawings shown embodiments but can be modified within the scope of the enclosed claims.

The invention claimed is:

1. A method of performing monitoring-continuity in case of number portability in a telecommunication system, comprising: requiring, by a monitored user, number portability from an operator of a donor network to an operator of a recipient network and receiving at an agency controlled receiving entity a number portability event—temporary address including information related to a user's ported identity and a user's new identity, wherein the agency controlled entity is equivalent to a monitoring function and the donor network is configured to intercept the user based on the user's ported MSISDN as target identity, the method further comprising the step of receiving at an Interception Control Element in the recipient network, an order to intercept the user based on the user's temporary MSISDN set as target identity, further comprising step: detecting lapse of a time period; setting a proper network configuration for the user's ported MSISDN so that any call to the user's ported MSISDN is routed to the recipient network receiving at the monitoring function a number portability event—completion receiving at the Interception Control Element in the recipient network, an order to remove interception of the user's temporary MSISDN and receiving at the Interception Control Element (MSC-R) in the recipient network, an order to intercept the user wherein the user's previously ported MSISDN is set as target.

2. The method according to claim 1, wherein the information related to the user's ported identity comprises an user's ported MSISDN and the information related to an user's new identity comprises the user's temporary MSISDN.

3. The method according to claim 2, wherein the agency controlled receiving entity is equivalent to a Data Retention System and the number portability event—temporary address further comprises a first time stamp indicating start time to validate the user's temporary MSISDN.

4. The method according to claim 3, further comprising: detecting a time period;
setting a proper network configuration for the user's ported MSISDN so that any call to the user's ported MSISDN is routed to the recipient network; and
receiving at the Data Retention System, a number portability event—completion that comprising a second time stamp indicating start time to validate the user's previously ported MSISDN.

5. The method according to claim 3, further comprising:
receiving at the Data Retention System from an agency, a request for subscriber data within a specified time range;
detecting the requested subscriber data in the Data Retention System; and
sending the requested subscriber data from the Data Retention System to the agency.

6. The method according to claim 1, wherein the number portability event is received from either the recipient network or the donor network.

7. An arrangement suitable for performing monitoring-continuity in case of number portability in a telecommunication system, the arrangement comprising:
means for requiring number portability from an operator of a donor network to an operator of a recipient network comprising, and
means for receiving at an agency controlled receiving entity, a number portability event—temporary address comprising information related to a user's ported identity and a user's new identity, wherein the agency controlled entity is equivalent to a monitoring function, wherein the donor network is configured to intercept the user based on the user's ported MSISDN as target identity, which arrangement further comprises:

means for receiving at an Interception Control Element in the recipient network, an order to intercept the user based on the user's temporary MSISDN set as target identity, further comprising: means for detecting lapse of a time period; means for setting a proper network configuration for the user's ported MSISDN so that any call to the user's ported MSISDN is routed to the recipient network;

means for receiving at the monitoring function, a number portability event—completion;

means for receiving at the Interception Control Element in the recipient network, an order to remove interception of the target temporary MSISDN; and means for receiving at the Interception Control Element in the recipient network, an order to intercept the user wherein the user's previously ported MSISDN is set as target.

8. The arrangement according to claim 7, wherein the information related to the user's ported identity comprises the user's ported MSISDN and the information related to the user's new identity comprises the user's temporary MSISDN.

9. The arrangement according to claim 8, wherein the agency controlled receiving entity is equivalent to a Data Retention System and the number portability event—temporary address further comprises a first time stamp indicating start time to validate temporary MSISDN.

10. The arrangement according to claim 9, further comprising:
means for detecting lapse of a time period; means for setting a proper network configuration for the user's ported MSISDN so that any call to the user's ported MSISDN is routed to the recipient network; and
means for receiving at the Data Retention, a number portability event—completion comprising a second time stamp indicating start time to validate the user's previously ported MSISDN.

11. The arrangement according to claim 9, which arrangement further comprises:
means for receiving to the Data Retention System from an agency, a request for subscriber data within a specified time range;
means for detecting requested subscriber data in the Data Retention System; and
means for sending requested subscriber data from the Data Retention System to the agency.

12. The arrangement according to claim 7, comprising means for sending the number portability event from either the recipient network or the donor network.

13. A computer readable storage medium non-transitorily storing executable codes which when executed by a processor of a telecommunications node, wherein perform a method including:
requiring, by a monitored user, number portability from an operator of a donor network to an operator of a recipient network; and
receiving at an agency controlled receiving entity, a number portability event—temporary address including information related to a user's ported identity and a user's new identity, wherein the agency controlled entity is equivalent to a monitoring function, wherein the donor network is configured to intercept the user based on the user's ported MSISDN as target identity, which arrangement further comprises:

means for receiving at an Interception Control Element in the recipient network, an order to intercept the user based on the user's temporary MSISDN set as target identity, further comprising: means for detecting lapse of a time period; means for setting a proper network configuration for the user's ported MSISDN so that any call to the user's ported MSISDN is routed to the recipient network;

means for receiving at the monitoring function, a number portability event—completion;

means for receiving at the Interception Control Element in the recipient network, an order to remove interception of the target temporary MSISDN; and means for receiving at the Interception Control Element in the recipient network, an order to intercept the user wherein the user's previously ported MSISDN is set as target.

* * * * *

UNITED STATES PATENT AND TRADEMARK OFFICE
CERTIFICATE OF CORRECTION

| | |
|---|---|
| PATENT NO. | : 8,666,405 B2 |
| APPLICATION NO. | : 12/990910 |
| DATED | : March 4, 2014 |
| INVENTOR(S) | : Imbimbo et al. |

It is certified that error appears in the above-identified patent and that said Letters Patent is hereby corrected as shown below:

In the Claims

In Column 10, Line 41, in Claim 10, delete "Data Retention," and insert -- Data Retention System, --, therefor.

Signed and Sealed this
Eighth Day of July, 2014

Michelle K. Lee
*Deputy Director of the United States Patent and Trademark Office*